United States Patent [19]
Kisselmann et al.

[11] 3,722,459
[45] Mar. 27, 1973

[54] INDICATING INSTRUMENT

[75] Inventors: Willy Kisselmann, Grunwald near Munich; Fritz Rumpelein, Munich; Paul Kopf, Unterhaching, all of Germany

[73] Assignee: Agfa-Gevaert Aktiengesellschaft, Leverkusen, Germany

[22] Filed: Apr. 10, 1970

[21] Appl. No.: 27,267

[30] Foreign Application Priority Data

Apr. 18, 1969 Germany..................P 19 19 883.5

[52] U.S. Cl.............116/129 R, 116/116, 324/154, 350/112, 353/14
[51] Int. Cl..............................................G09f 9/00
[58] Field of Search....116/114, 129 E, 129 F, 129 L, 116/129 T, 133, 135; 240/1 EL; 350/110, 112; 353/14, 40, 42, 81; 40/130 K, 130, 137; 324/114, 115, 154; 58/126 A, 126 D, 127, 50

[56] References Cited

UNITED STATES PATENTS

| | | | |
|---|---|---|---|
| 1,088,897 | 3/1914 | Gyr | 350/112 X |
| 1,414,628 | 5/1922 | Cuntz | 58/50 |
| 1,694,307 | 12/1928 | Booth | 116/129 F |
| 1,914,973 | 6/1933 | Mashbir | 116/129 R |
| 2,428,792 | 10/1947 | Evans | 116/129 P |
| 2,539,654 | 1/1951 | Barnes | 116/124.1 X |
| 2,561,885 | 7/1951 | Prideaux et al. | 116/129 R X |
| 2,750,918 | 6/1956 | William | 116/133 |
| 3,590,773 | 7/1971 | Ruppert | 116/129 T |

FOREIGN PATENTS OR APPLICATIONS

| | | | |
|---|---|---|---|
| 808,645 | 7/1951 | Germany | 116/116 |
| 107,937 | 12/1965 | Norway | 116/135 |

*Primary Examiner*—Louis J. Capozi
*Attorney*—Michael S. Striker

[57] ABSTRACT

An indicating instrument wherein the housing accommodates a moving-coil instrument whose pointer travels along one surface of an elongated prism. The one surface carries a straight scale and another surface of the prism is mirrored to reflect the images of the scale and of the tip of the pointer toward the front side of the housing. At least some graduations of the scale constitute openings or cutouts which permit observation of the tip in corresponding angular positions of the pointer.

16 Claims, 4 Drawing Figures

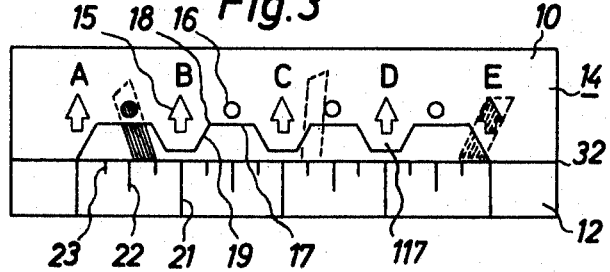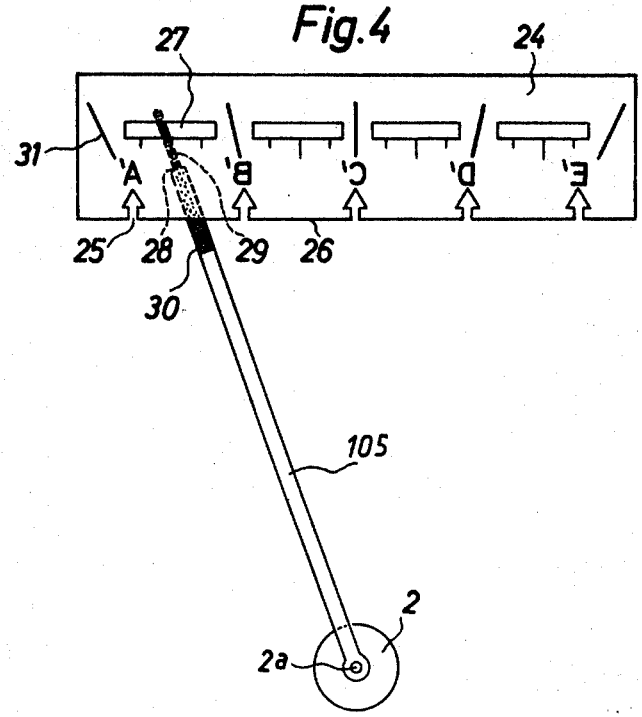

INDICATING INSTRUMENT

CROSS-REFERENCE TO RELATED APPLICATION

The indicating instrument of the present invention constitutes an improvement over and a further development of the instrument which is disclosed in the copending application Ser. No. 21,416, filed Mar. 20, 1970 by Kisselmann et al. and assigned to the same assignee.

BACKGROUND OF THE INVENTION

The present invention relates to indicating instruments in general, and more particularly to improvements in instruments of the type wherein the pointer of a moving-coil instrument or the like is movable along one or more scales whose graduations are indicative of the corresponding angular positions of the pointer.

As a rule, the scale which is associated with a pivotable pointer extends along an arc adjacent to the path of movement of the free end portion or tip of the pointer. Such instruments cannot be utilized, or are less practical, under certain circumstances when the positions of a pivotable pointer should be determined with reference to one or more straight scales. For example, all portions of an arcuate scale cannot be observed with the same facility at the front side of the dashboard in an automotive vehicle.

SUMMARY OF THE INVENTION

An object of the invention is to provide an improved indicating instrument wherein the positions of a pivotable pointer can be read on one or more straight scales.

Another object of the invention is to provide an indicating instrument which is compact, simple and inexpensive, and which can be mass-produced as a building block for insertion into various assemblies wherein the condition of a circuit is to be indicated by a pivotable pointer.

A further object of the invention is to provide a novel scale for use in the improved indicating instrument as well as novel means for rendering the image of the scale and of the pointer visible from a desired direction.

An additional object of the invention is to provide an indicating instrument wherein the scale which indicates the positions of a pivotable pointer is provided with novel graduations which facilitate rapid, convenient and accurate determination of such positions.

The invention is embodied in an indicating instrument which comprises a housing having an elongated narrow front side and preferably consisting, at least in part, of light-diffusing material, meter means (such as a moving-coil instrument) mounted in the housing and including a pointer pivotable about a predetermined axis which is preferably remote from and normal to the longitudinal direction of the front side of the housing whereby the end portion of the pointer travels along an elongated arcuate path extending substantially lengthwise of the front side when the pointer is caused to change its angular position, an elongated light-transmitting prism adjacent to one side of the path of movement of the end portion and having a first surface facing such end portion and a second surface which makes with the first surface an acute angle and faces away from the end portion, and an opaque scale provided on the first surface of the prism and having one or more sets of graduations in the form of openings and/or cutouts through which the end portion is observable in the corresponding angular positions of the pointer. At least a portion of the second surface constitutes a mirror which reflects the image of the scale toward the front side of the housing. The remainder of the second surface may be coated with an opaque liner which can constitute an auxiliary scale whose preferably parallel graduations register with the openings of the scale on the first surface and which is directly observable by looking through the prism from the front side of the housing.

The novel features which are considered as characteristic of the invention are set forth in particular in the appended claims. The improved indicating instrument itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a front elevational view of the indicating instrument as seen from the left-hand side of FIG. 1; and FIG. 4 is a fragmentary horizontal sectional view of a modified indicating instrument.

DESCRIPTION OF THE PREFERRED EMBODIMENTS

Figure 1:
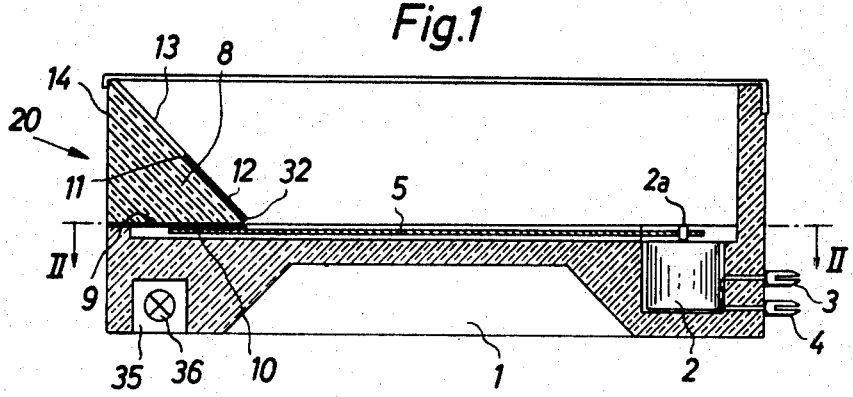
FIG. 1 is a longitudinal sectional view of an indicating instrument which embodies one form of the invention.
Figure 2:
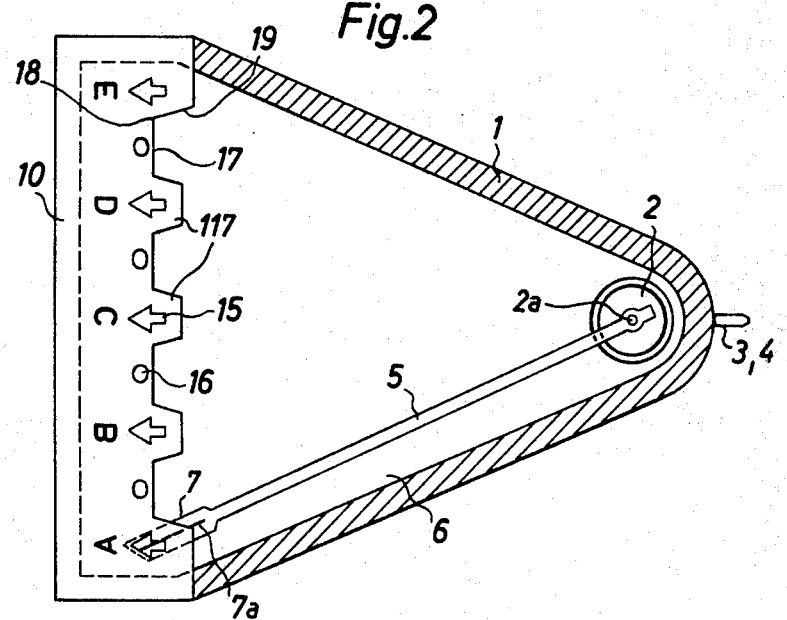
FIG. 2 is a horizontal sectional view as seen in the direction of arrows from the line II—II of FIG. 1.

The indicating instrument of FIGS. 1 and 2 comprises a housing 1 consisting of a material with light-diffusing characteristics. The housing 1 accommodates an electric measuring instrument here shown as a moving-coil instrument 2 (called meter for short) whose output shaft 2a carries an elongated pointer or needle 5. The electric terminals 3, 4 of the meter 2 extend from the housing 1 and can be connected in a circuit, not shown.

The housing 1 is provided with an internal recess 6 wherein the pointer 5 is pivotable back and forth between two end positions about the axis of the output shaft 2. The free end portion or tip 7 of the pointer 5 is somewhat wider than the remainder of the pointer and this tip is coated with a luminescent paint.

A light-transmitting elongated prism 8 is mounted in the housing 1 adjacent to the path of movement of the tip 7; this prism has a triangular cross-sectional outline and has a front surface 14 which is adjacent to the front side 20 of the housing 1, a surface 9 which faces the tip 7 and is located in a plane which is substantially normal to the axis of the shaft 2a, and a surface 11 which makes an acute angle with the surface 9. The surface 11 faces away from the tip 7. The surface 9 is partially overlapped by a light-obstructing opaque scale 10. That portion of the surface 11 which is adjacent to the meeting edge 32 of the surfaces 9 and 11 is coated with a liner 12 and the remaining portion 13 of the surface 11 is mirrored so that it reflects the image of the scale 10 and tip 7 toward the front side 20.

The bottom surface of the housing 1 is provided with an elongated recess or chamber 35 which is parallel to the prism 8 and accommodates illuminating means including one or more light sources 36, preferably pin-shaped electric lamps.

FIG. 2 shows that the scale 10 is provided with a set of arrowhead-shaped main openings or graduations 15 adjacent to apertures in the form of symbols A, B, C, D and E. The images of the openings 15 and symbols A-E are reflected by the portion 13 of the surface 11. In addition, the scale 10 is formed with a set of circular auxiliary openings or graduations 16 which alternate with the openings 15; each opening 16 is located midway between the two adjacent openings 15. The width of the tip 7 and the dimensions of the openings 15, 16 (as considered in the longitudinal direction of the prism 8) are selected in such a way that the tip can overlie the entire opening 15 or 16 when the pointer 5 assumes a corresponding angular position. One marginal portion of the scale 10 is formed with notches 17 which alternate with the arrowhead-shaped openings 15 and register with the openings 16. Such serrated marginal portion of the mask 10 is adjacent to the edge 32 between the surfaces 9 and 11. The corner portions 18 of the notches 17 constitute additional graduations each of which is located between an opening 15 and the adjacent opening 16. This is shown in FIG. 2. It can be said that the corner portions 18 constitute the foremost parts of inclined edge faces 19 of the scale 10 in the respective notches 17. The openings 15 of each pair of adjacent openings 15 are separated from each other by a centrally located circular opening 16 and two corner portions 18. The portions 18 are desirable in the event that there is no room for the provision of additional openings, i.e., if the openings would have to be placed so close to each other that the tip 7 of the pointer 5 would be visible simultaneously behind or in registry with two openings. To further facilitate the reading of the exact position of the pointer 5, the latter's tip 7 can be provided with a centrally located line-shaped marker 7a which extends radially of the shaft 2a.

FIG. 3 is a front elevational view of the instrument, as seen from the left-hand side of FIG. 1 or 2. The person observing the scale 10 and the tip 7 is assumed to look in the direction of the arrow representing the lead line of the numeral 20 in FIG. 1. The user can look through the surface 14 of the prism 8 and sees the image of the scale 10, i.e., the openings 15, the openings 16 and the corner portions 18. The lower part of the image of the scale 10 is bounded by a line representing the edge 32 between the surfaces 9 and 11 of the prism 8. The liner 12 is visible below the scale 10; this liner is provided with graduations 21, 22 and 23 which respectively register with the openings 15, 16 and corner portions 18. The purpose of the graduations 21–23 is to facilitate an accurate determination of the position of the pointer 5. The position of the tip 7 can be determined more rapidly but with lesser accuracy by looking at the image of the scale 10. It will be seen that the liner 12 constitutes an auxiliary scale.

The surface 9 of the prism 8 is preferably closely adjacent to the path of movement of the tip 7 and makes an angle of 90° with the front surface 14. It is clear that the prism 8 can be mounted below the pointer 5 and that the housing 1 can accommodate one or more additional lamps 36 or analogous illuminating means.

A person looking at the front side 20 of the housing 1 sees the image of a straight scale 10 and can directly observe the auxiliary scale 12 on the surface 11. The image of the scale 10 appears in a plane which is substantially parallel to the front side 20. Another advantage of the improved indicating instrument is that it occupies very little room, especially as considered at right angles to the plane of movement of the pointer 5 (vertically, as seen in FIG. 1). This is due to the fact that the main scale 10 is applied directly to that surface (9) of the prism 8 which faces the end portion 7 of the pointer. An indicating instrument of the type shown in FIGS. 1 to 3 can be used with advantage in radio receivers for automotive vehicles or the like. For example, the pointer 5 can indicate the selected station. Discrimination between various stations is facilitated by the fact that the configuration and/or dimensions of the set of openings 15 are different from those of the set of openings 16 and corner portions 18. It will be seen that the two sets of openings 15, 16 form a single row and are equidistant or nearly equidistant from that marginal portion of the main scale 10 which is adjacent to the edge 32.

An important and advantageous function of the notches 17 is to permit determination of the position of the pointer 5 when the tip 7 does not register with an opening 15 or 16. Moreover, and as shown in FIG. 2 or 3, the teeth 117 between the notches 17 of the scale 10 do not extend all the way to the edge 32 so that the pointer 5 is visible at all times in the space directly above the liner 12, as seen in FIG. 3.

The auxiliary scale 12 permits rapid determination of the angular position of the pointer 5 when the front side 20 of the housing 1 is looked at from above, i.e., at an oblique angle to the front surface 14. Also, the scale 12 prevents reflection of light on the surface 9.

The light source 36 is preferably provided with terminals, analogous to the terminals 3 and 4, to facilitate rapid and convenient connection to an energy source. The housing 1 can be pushed into or withdrawn from a complementary chamber provided therefor in a radio receiver or the like. In this way, a defective indicating instrument can be rapidly replaced with a new one.

FIG. 4 illustrates a portion of a modified indicating instrument. The scale 10 is replaced with a straight scale 24 which is provided with a set of arrowhead-shaped openings or graduations 25 each adjacent to one of the apertures or symbols A', B', C', D', E'. The openings 25 are provided in that marginal portion 26 of the scale 24 which is adjacent to the edge between the surfaces 9 and 11 of the prism 8 (not shown in FIG. 4). The scale 24 is further provided with a set of longitudinally extending slot-shaped openings 27 each associated with a relatively long centrally located graduation and two shorter graduations which flank the respective long graduation.

The distance between the row of openings 25 in the marginal portion 26 and the row of slot-shaped openings 27 depends on the distance between the axis of the shaft 2a and that point (28) on the pointer 105 which is immediately outwardly adjacent to the two outermost openings 25 (i.e., the point 28 is immediately adjacent to and located above the opening 25 which is adjacent to the symbol A' or E' in the corresponding angular position of the pointer 105. This insures that the outer part 29 of the tip of the pointer 105, which is coated with a color differing from the color of the remaining part 30 of the tip, cannot be seen in the openings 25 but is visible in the slots 27. The part 30 of the tip of the pointer 105 is disposed between the shaft 2a and the point 28; this part can be seen only in the openings 25. Such coloring of the pointer 105 further contributes to the convenience of determining the angular position of the pointer tip with reference to the scale 24. Thus, the reading of the position of the pointer 105 is facilitated by employing different openings and also by using a pointer which is colored in such a way that one of the several colors can be seen through the openings 24 and the other color can be seen only through the openings 27. This enables the user to readily discriminate between the main openings 25 and auxiliary openings 27.

The scale 24 further carries graduations 31 which are disposed radially of the axis of the shaft 2a and each of which terminates adjacent to one of the symbols A'–E'. As shown, each slot-shaped opening 27 is flanked by two graduations 31 to thus enable the user to immediately determine, at a glance, which of the openings 27 is located between the corresponding openings 25. The graduations 31 are particularly useful for facilitating the determination of location of the two outermost openings 27.

Though FIG. 4 does not show it, the liner 12 can also be used in the instrument which embodies the scale 24 and is then provided with graduations which may correspond to those shown at 21–23 in FIG. 3 to further facilitate determination of the angular position of the pointer 105. The graduations on the liner 12 are preferably parallel to each other.

It will be noted that the openings 25 are much closer to the marginal portion 26 than the openings 27; in fact, the openings 25 are provided in the marginal portion 26. FIG. 4 further shows that the width of the outermost part 29 of the end portion of the pointer 105 is less than the width of the part 30 which travels along the openings 25. This also contributes to convenience of determining the angular position of the pointer 105 with reference to the scale 24. As the pointer 105 pivots about the axis of the shaft 2a, its part 29 is visible through one of the openings 27 when the part 30 is concealed by the scale 24, and the part 30 is visible when the part 29 is concealed. The point 28 between the parts 29, 30 is concealed in all angular positions of the pointer 105.

The tip of the pointer 5 or the part 29 and/or 30 of the pointer 105 can consist of light-transmitting material. This is particularly effective if the illuminating means is adjacent to that side of the tip which faces away from the prism, i.e., if the illuminating means is located behind the main scale 10 or 24.

It is clear that the improved indicating instrument is susceptible of many additional modifications. For example, the openings in the scale 10 or 24 can assume any desired shape or size (the latter within practical limits), and the graduations 31 of FIG. 4 can be replaced with narrow slit-shaped openings in the scale 24. All such modifications will be readily understood with reference to the embodiments shown in FIGS. 1 to 3 and 4.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. An indicating instrument, comprising a housing having a front side; meter means mounted in said housing and including a pointer pivotable about a predetermined axis, said pointer having an end portion movable along an arcuate path extending substantially lengthwise of said front side; an elongated straight prism closely adjacent to said path and having a first surface facing said end portion and a second surface facing away from said end portion, said surfaces making an acute angle with each other; and a flat opaque scale provided on said first surface and having graduations in the form of at least one set of openings through which said end portion is observable in corresponding angular positions of said pointer, said scale comprising an elongated straight marginal portion and all openings of said one set being at least substantially equidistant from said marginal portion, at least a portion of said second surface constituting a mirror which reflects the image of said scale along a straight line toward the front side of said housing.

2. An indicating instrument as defined in claim 1, wherein said openings include at least two sets of differently configurated openings and wherein said scale is further provided with apertures in the form of symbols identifying the openings of at least one of said sets.

3. An indicating instrument as defined in claim 1, wherein the openings of said one set are disposed at a first distance from said marginal portion and said graduations include at least one second set of openings located at a second distance from said marginal portion.

4. An indicating instrument as defined in claim 3, wherein the end portion of said pointer includes a first part which travels along said first set of openings and a second part which travels along said second set of openings in response to pivotal movement of said pointer.

5. An indicating instrument as defined in claim 4, wherein said first and second parts of the end portion of said pointer are readily distinguishable from each other.

6. An indicating instrument as defined in claim 1, wherein the end portion of said pointer consists of light-transmitting material.

7. An indicating instrument as defined in claim 1, wherein the width of said end portion and the widths of and the distances between said openings, as considered in the longitudinal direction of said path, are such that the end portion registers with a single opening at a time.

8. An indicating instrument as defined in claim 1 wherein said surfaces meet along an elongated edge and said marginal portion is adjacent to said edge, said marginal portion being provided with equidistant notches.

9. An indicating instrument as defined in claim 8, wherein the openings of said one set alternate with said notches and said graduations include a second set of openings registering with said notches.

10. An indicating instrument as defined in claim 9, wherein portions of said notches constitute additional graduations which alternate with the openings of said one set.

11. An indicating instrument as defined in claim 1, wherein said prism is of triangular cross-sectional outline and comprises a third surface which is at least substantially parallel with the front side of said housing.

12. An indicating instrument as defined in claim 1, further comprising an opaque liner coating a portion of said second surface.

13. An indicating instrument as defined in claim 12, wherein said liner constitutes a graduated auxiliary scale extending in parallelism with said first-mentioned scale and adjacent to the meeting edge of said first and second surfaces.

14. An indicating instrument as defined in claim 13, wherein the graduations of said auxiliary scale are parallel lines each registering with one of said openings.

15. An indicating instrument as defined in claim 1, wherein at least that portion of said housing which is adjacent to the end portion of said pointer and to said prism consists of light-diffusing material, and further comprising illuminating means for such portion of said housing.

16. An indicating instrument as defined in claim 1, wherein the end portion of said pointer is luminescent.

* * * * *